(12) United States Patent
Yoon et al.

(10) Patent No.: US 11,925,278 B2
(45) Date of Patent: Mar. 12, 2024

(54) WALL MOUNT AND DISPLAY APPARATUS HAVING THE SAME

(71) Applicant: SAMSUNG ELECTRONICS CO., LTD., Suwon-si (KR)

(72) Inventors: Daesik Yoon, Suwon-si (KR); Jungwon Min, Suwon-si (KR); Yonghwan Park, Suwon-si (KR); Hosuk Chae, Suwon-si (KR); Minkeun Kim, Suwon-si (KR); Minchul Kim, Suwon-si (KR); Junki Noh, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 280 days.

(21) Appl. No.: 17/575,305

(22) Filed: Jan. 13, 2022

(65) Prior Publication Data

US 2022/0378226 A1 Dec. 1, 2022

Related U.S. Application Data

(63) Continuation of application No. PCT/KR2021/020307, filed on Dec. 30, 2021.

(30) Foreign Application Priority Data

May 31, 2021 (KR) .................. 10-2021-0070291

(51) Int. Cl.
*A47F 5/08* (2006.01)
*F16M 11/12* (2006.01)

(52) U.S. Cl.
CPC ............. *A47F 5/08* (2013.01); *F16M 11/121* (2013.01); *F16M 2200/021* (2013.01); *F16M 2200/065* (2013.01)

(58) Field of Classification Search
CPC .. A47F 5/08; F16M 11/121; F16M 2200/021; F16M 2200/065; H04N 5/655
(Continued)

(56) References Cited

U.S. PATENT DOCUMENTS 8,693,172 B2 * 4/2014 Russell .............. F16M 11/2085
361/679.01
9,383,060 B2 * 7/2016 Geier ..................... F16M 13/02
(Continued)

FOREIGN PATENT DOCUMENTS

CN 1627889 A 6/2005
JP 2001-290436 10/2001
(Continued)

OTHER PUBLICATIONS

International Search Report issued in International Patent Application No. PCT/KR2021/020307 dated May 31, 2021.

*Primary Examiner* — Anita M King
(74) *Attorney, Agent, or Firm* — STAAS & HALSEY LLP

(57) ABSTRACT

A display apparatus including a display, and a support member including a fixing member to be fixed to a wall surface, a mounting member on which the display is to be mounted and connected to the fixing member, and a connector attaching the mounting member to the fixing member and supported for rotation in forward, backward, leftward, and rightward directions, in which the connector includes a plurality of rotatable supports connected to the fixing member and supported for rotation in the leftward and rightward directions, a plurality of movable supports connected to the rotatable supports and supported for slidable movement in the leftward and rightward directions, and a plurality of connecting supports connected to the mounting member and supported for rotation in the forward and backward direc- (Continued)

tions, and connected to the movable supports to rotate in the leftward and rightward directions.

20 Claims, 17 Drawing Sheets

(58) Field of Classification Search
USPC .............................................. 248/274.1, 917
See application file for complete search history.

(56) References Cited

U.S. PATENT DOCUMENTS

| | | |
|---|---|---|
| 9,551,453 B2 * | 1/2017 | Walters .................. F16M 11/12 |
| 10,944,937 B2 * | 3/2021 | Pei .......................... F16M 11/10 |
| 11,684,527 B2 * | 6/2023 | Vuorenoja ............. A61G 3/085 |
| | | 296/19 |
| 2010/0271798 A1 | 10/2010 | Yeo et al. |
| 2015/0250315 A1 * | 9/2015 | Gross ................... H05K 5/0017 |
| | | 361/679.01 |

FOREIGN PATENT DOCUMENTS

| | | |
|---|---|---|
| JP | 2004-363788 | 12/2004 |
| JP | 2011-48114 | 3/2011 |
| KR | 10-2006-0066943 A | 6/2006 |
| KR | 10-0765242 B1 | 10/2007 |
| KR | 10-2010-0131165 A | 12/2010 |
| KR | 10-2013-0004706 | 1/2013 |
| KR | 10-1273595 | 6/2013 |
| KR | 10-1949477 | 2/2019 |

* cited by examiner

WALL MOUNT AND DISPLAY APPARATUS HAVING THE SAME

CROSS-REFERENCE TO RELATED APPLICATIONS

This application is a Bypass Continuation of International Patent Application No. PCT/KR2021/020307, filed on Dec. 30, 2021, which claims priority from and the benefit of Korean Patent Application No. 10-2021-0070291, filed on May 31, 221, each of which is hereby incorporated by reference for all purposes as if fully set forth herein.

BACKGROUND

Field

Illustrative embodiments of the invention relate generally to display devices and, more particularly, to a wall mount that can be rotated in forward and backward directions, as well as in leftward and rightward directions, while mounting a display thereon, and a display apparatus having the same.

Discussion of the Background

A display apparatus, such as a monitor, a television, or the like, is an apparatus that may display images. The display apparatus typically employs an emissive display panel such as an organic light-emitting diode (OLED) panel, or a non-emissive display panel such as a liquid crystal display (LCD) panel.

The display apparatus may include a display for displaying an image, a support device for supporting the display, and the like. When a display having a substantially flat shape or a curved shape is to stand upright from the floor, a stand may be used as a support device. In addition, when the display is to be hung on a wall, a wall mount that can be fixed to the wall may be used as a support device.

After a display is mounted on a wall mount and fixed to the wall, the wall mount may need to be rotated in various directions, such as in forward and backward directions, as well as in leftward and rightward directions, to adjust the display in a desired angle.

The above information disclosed in this Background section is only for understanding of the background of the inventive concepts, and, therefore, it may contain information that does not constitute prior art.

SUMMARY

Applicant realized several drawbacks in conventional wall mounts for display devices. For example, conventional wall mounts typically utilize a spring hinge for forward and backward movements of the wall mount, which increases the thickness of the wall mount and associated material costs. In addition, conventional wall mounts also typically employ a link structure for left and right movements of the wall mount, which also increases the thickness of the wall mount.

Wall mounts for display devices constructed according to the principles and illustrative embodiments of the invention are capable of being rotated in forward and backward directions, as well as in leftward and rightward directions, while mounting a display device thereon.

Wall mounts for display devices constructed according to the principles and illustrative embodiments of the invention may be tilted or swiveled in various directions while having a thin form-factor, especially in the compact position, with reduced material costs compared with conventional wall mounts for display devices.

Additional features of the inventive concepts will be set forth in the description which follows, and in part will be apparent from the description, or may be learned by practice of the inventive concepts.

According to one aspect of the invention, a display apparatus includes a display, and a support member including a fixing member to be fixed to a wall surface, a mounting member on which the display is to be mounted and connected to the fixing member, and a connector attaching the mounting member to the fixing member and supported for rotation in forward, backward, leftward, and rightward directions, the connector including a plurality of rotatable supports connected to the fixing member and supported for rotation in the leftward and rightward directions, a plurality of movable supports connected to a corresponding one of the rotatable supports and supported for slidable movement in the leftward and rightward directions, and a plurality of connecting supports each connected to the mounting member and supported for rotation in the forward and backward directions, and connected to a corresponding one of the movable supports to rotate in the leftward and rightward directions.

The support member may include a wall mount, the fixing member may include a fixing bracket, the mounting member may include a mounting bracket, the connector may include a connecting device, the rotatable supports may include rotating brackets, the movable supports may include moving brackets, and/or the connecting supports may include connecting brackets.

The rotating brackets may include a plurality of protrusions extending in a direction toward the moving brackets.

Each of the moving brackets may include a slot into which the protrusions are inserted and supported for linear movement.

Each of the moving brackets may be connected to a corresponding one of the rotating brackets by fastening members connected to the protrusions inserted into the slot.

The slot may extend longitudinally in a rail along the direction of linear movement of the moving brackets.

The moving brackets, in response to the mounting bracket being rotated in the forward and backward directions and leftward and rightward directions, may slide in the leftward and rightward directions with respect to the rotating brackets.

Each of the rotatable supports may include a first connection hole for connection to the fixing member, and the fixing member may include a plurality of first rotation holes provided at positions corresponding to the first connection holes.

Each of the movable supports may include a second connection hole for connection to a corresponding one of the connector supports, and each of the connector supports may include a second rotation hole at a position corresponding to the second connection hole, and a third connection hole through which the connector support is connected to the mounting member.

The rotatable supports may include a first rotating bracket connected to an upper left end of the fixing member, a second rotating bracket connected to a lower left end of the fixing member, a third rotating bracket connected to a upper right end of the fixing member, and a fourth rotating bracket connected to a lower right end of the fixing member.

The movable supports may include a first moving bracket, a second moving bracket, a third moving bracket, and a fourth moving bracket to correspond to the rotatable supports, and the connecting supports may include a first connecting bracket, a second connecting bracket, a third connecting bracket, and a fourth connecting bracket to correspond to the movable supports.

When the mounting member is moved forward, the first and second rotating brackets may be rotated in the leftward direction, the third and fourth rotating brackets may be rotated in the rightward direction, the first and second moving brackets may be moved to the right, and the third and fourth moving brackets may be moved to the left.

When the mounting member is rotated in the leftward direction, the first and second rotating brackets may be rotated in the rightward direction, the third and fourth rotating brackets may be rotated in the rightward direction, the first and second moving brackets may be moved to the left, and the third and fourth moving brackets may be moved to the left.

When the mounting member is rotated in the rightward direction, the first and second rotating brackets may be rotated in the leftward direction, the third and fourth rotating brackets may be rotated in the leftward direction, the first and second moving brackets may be moved to the right, and the third and fourth moving brackets may be moved to the right.

When the mounting member is rotated in the forward direction, the first and fourth rotating brackets may be rotated in the leftward direction, the second and third rotating brackets may be rotated in the rightward direction, the first and fourth moving brackets may be moved to the right, and the second and third moving brackets may be moved to the left.

When the mounting member is rotated in the backward direction, the first and fourth rotating brackets may be rotated in the rightward direction, the second and third rotating brackets may be rotated in the leftward direction, the first and fourth moving brackets may be moved to the left, and the second and third moving brackets may be moved to the right.

According to another aspect of the invention, a display apparatus includes a display, and a support member including a fixing member to be fixed to a wall surface, a mounting member on which the display is to be mounted and connected to the fixing member, and a connector attaching the mounting member to the fixing member and supported for rotation in forward, backward, leftward, and rightward directions, in which the connector includes a plurality of first supports rotatably connected to the fixing member, a plurality of second supports slidably connected to the first supports, and a plurality of third supports having a first end non-rotatably connected to the second supports and a second end rotatably connected to the mounting member.

Each of the second supports may include a second bracket including a rail supporting the second bracket for linear movement in the direction of linear movement of the corresponding first bracket.

The first supports may include first brackets, adjacent first brackets may be supported for rotation in opposite directions, and adjacent second brackets may be supported for linear movement in opposite directions.

Each of the first supports may substantially enclose a corresponding one of the second supports.

It is to be understood that both the foregoing general description and the following detailed description are illustrative and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, show illustrative embodiments of the invention, and together with the description serve to explain the inventive concepts.

DETAILED DESCRIPTION

Figure 1:
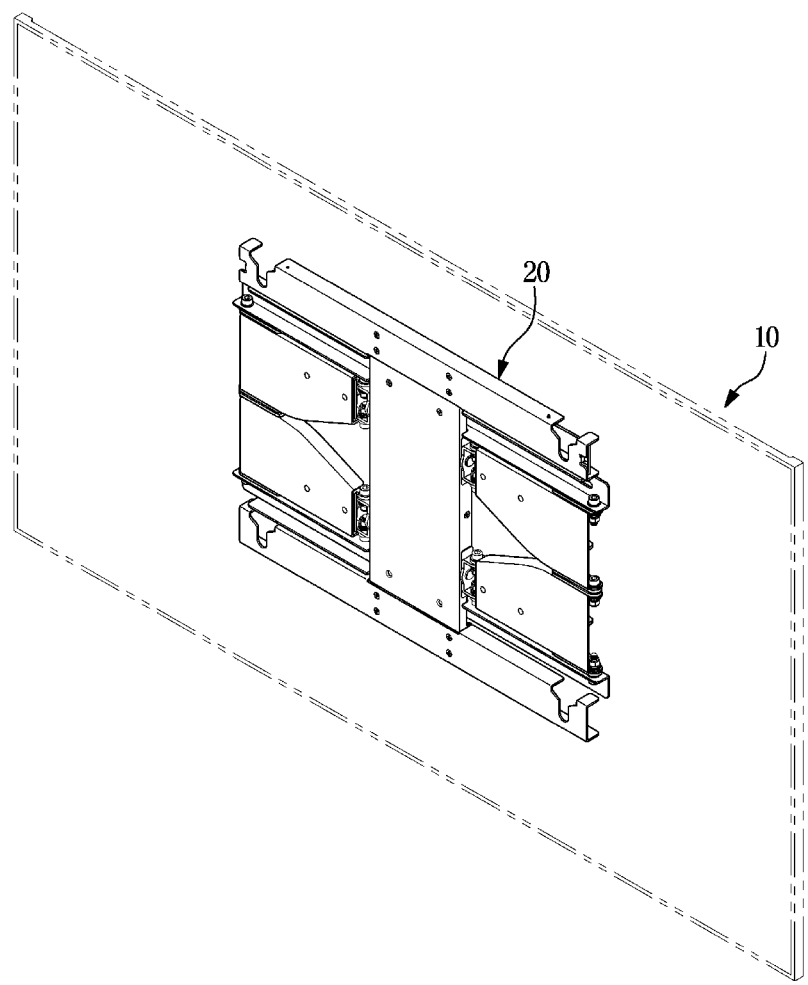
FIG. 1 is a perspective view illustrating an illustrative embodiment of a wall mount constructed according to the principles of the invention having a display mounted thereon.

In the following description, for the purposes of explanation, numerous specific details are set forth in order to provide a thorough understanding of various illustrative embodiments or implementations of the invention. As used herein "embodiments" and "implementations" are interchangeable words that are non-limiting examples of devices or methods employing one or more of the inventive concepts disclosed herein. It is apparent, however, that various illustrative embodiments may be practiced without these specific details or with one or more equivalent arrangements. In other instances, well-known structures and devices are shown in block diagram form in order to avoid unnecessarily obscuring various illustrative embodiments. Further, various illustrative embodiments may be different, but do not have to be exclusive. For example, specific shapes, configurations, and characteristics of an illustrative embodiment may be used or implemented in another illustrative embodiment without departing from the inventive concepts.

Unless otherwise specified, the illustrated illustrative embodiments are to be understood as providing illustrative features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an illustrative embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the illustrative term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various illustrative embodiments are described herein with reference to sectional and/or exploded illustrations that are schematic illustrations of idealized illustrative embodiments and/or intermediate structures. As such, variations from the shapes of the illustrations as a result, for example, of manufacturing techniques and/or tolerances, are to be expected. Thus, illustrative embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Hereinafter, a mount wall constructed according to the principles and illustrative embodiments of the invention will be described in detail with reference to the accompanying drawings.

Figure 2:
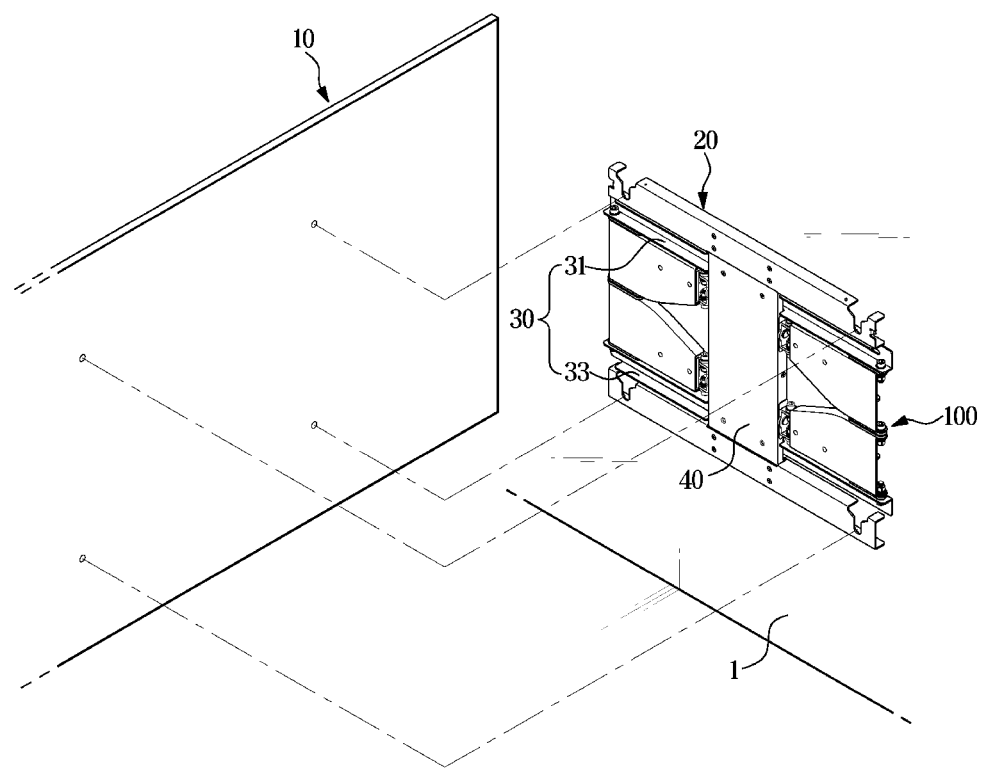
FIG. 2 is a perspective view illustrating a process of mounting a display on an embodiment of a wall mount fixed to a wall according to the principles of the invention.

FIG. 1 is a perspective view illustrating an illustrative embodiment of a wall mount constructed according to the principles of the invention having a display mounted thereon. FIG. 2 is a perspective view illustrating a process of mounting a display on an embodiment of a wall mount fixed to a wall according to the principles of the invention.

Although a display apparatus constructed according to illustrative embodiments hereinafter will be described and illustrated as a flat display apparatus, the inventive concepts are not limited thereto. For example, in some illustrative embodiments, the display apparatus may be a curved display apparatus having a fixed curvature screen, and/or a curvature variable display apparatus of which the curvature is variable according to an user input.

Referring to FIGS. 1 to 2, the display apparatus may include a display 10 for displaying an image, and a support member, which may be in the form of a wall mount 20, that can be fixed to a wall surface 1 to support the display 10.

The wall mount 20 may include a fixing member, which may be in the form of a fixing bracket 30, to attach the wall mount 20 to the wall surface 1. The fixing bracket 30 may form a rear surface of the wall mount 20.

The wall mount 20 may include a mounting member, which may be in the form of a mounting bracket 40, on which the display 10 is to be attached. The mounting bracket 40 may form a front surface of the wall mount 20. Accordingly, the display 10 may be mounted on the front surface of the wall mount 20.

The wall mount 20 may include a connector, which may be in the form of a connecting device 100 for connecting the fixing bracket 30 and the mounting bracket 40 to each other. The connecting device 100 may support the mounting bracket 40 for rotation relative to the fixing bracket 30 in one or more forward, backward, leftward, and rightward directions.

Figure 10:
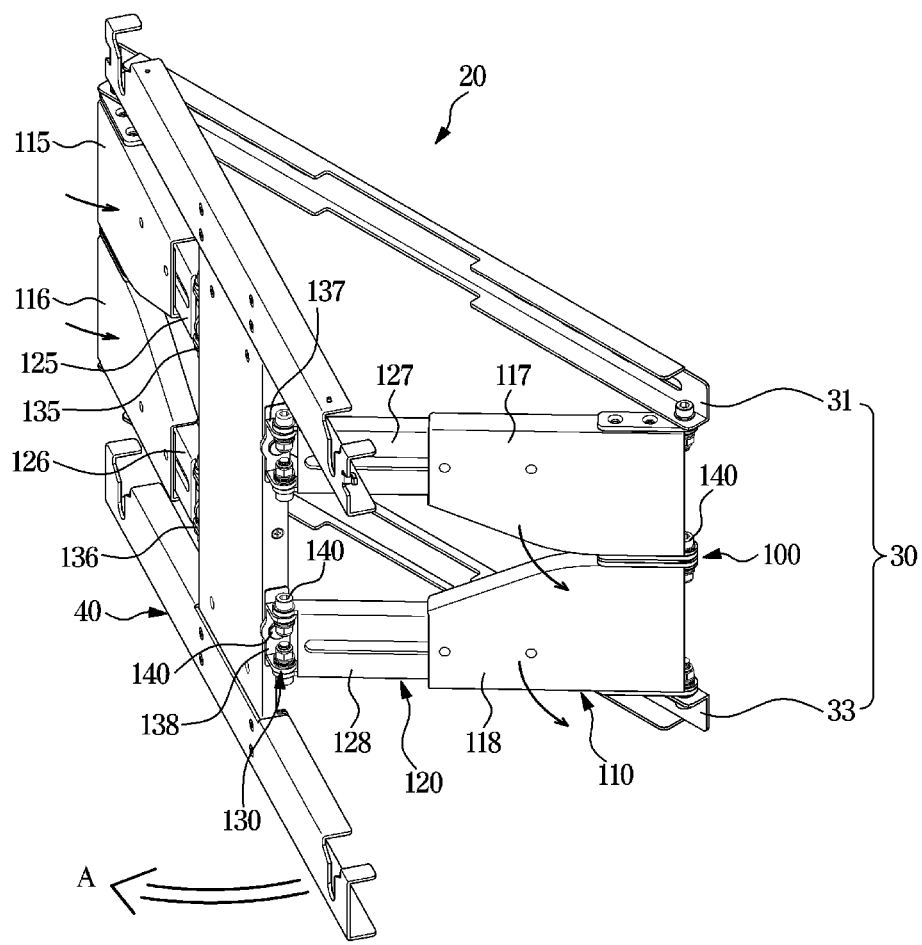
FIG. 10 is a perspective view illustrating a position of a mounting bracket of the wall mount of FIG. 1 rotated to the left according to the principles of the invention.
Figure 12:
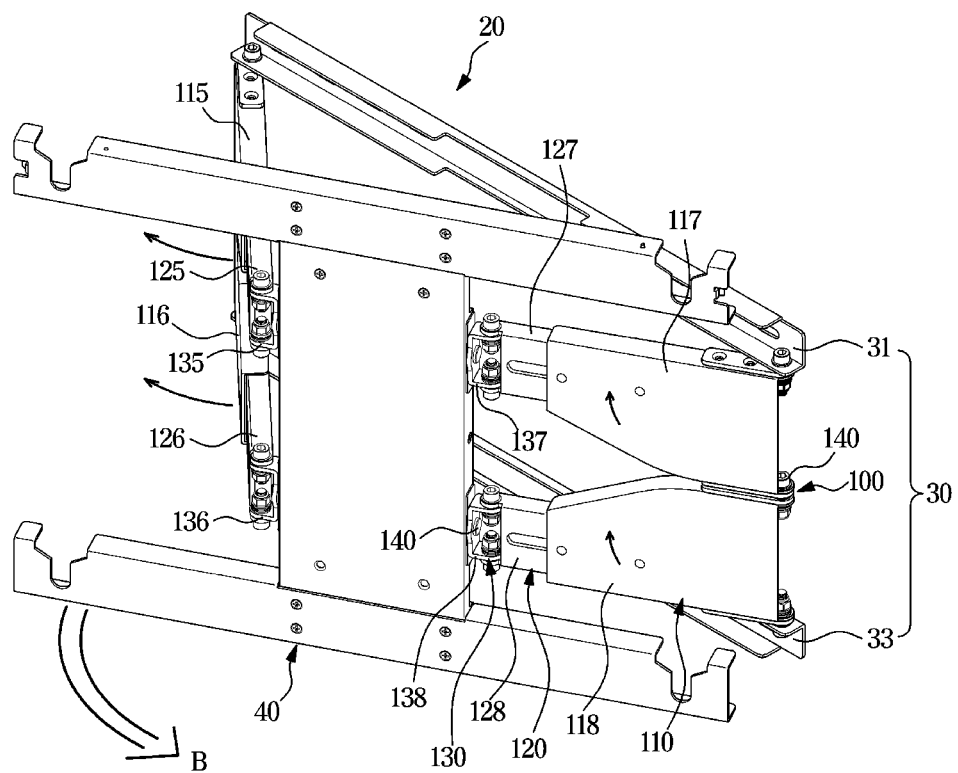
FIG. 12 is a perspective view illustrating a position of a mounting bracket of the wall mount of FIG. 1 rotated to the right according to the principles of the invention.
Figure 14:
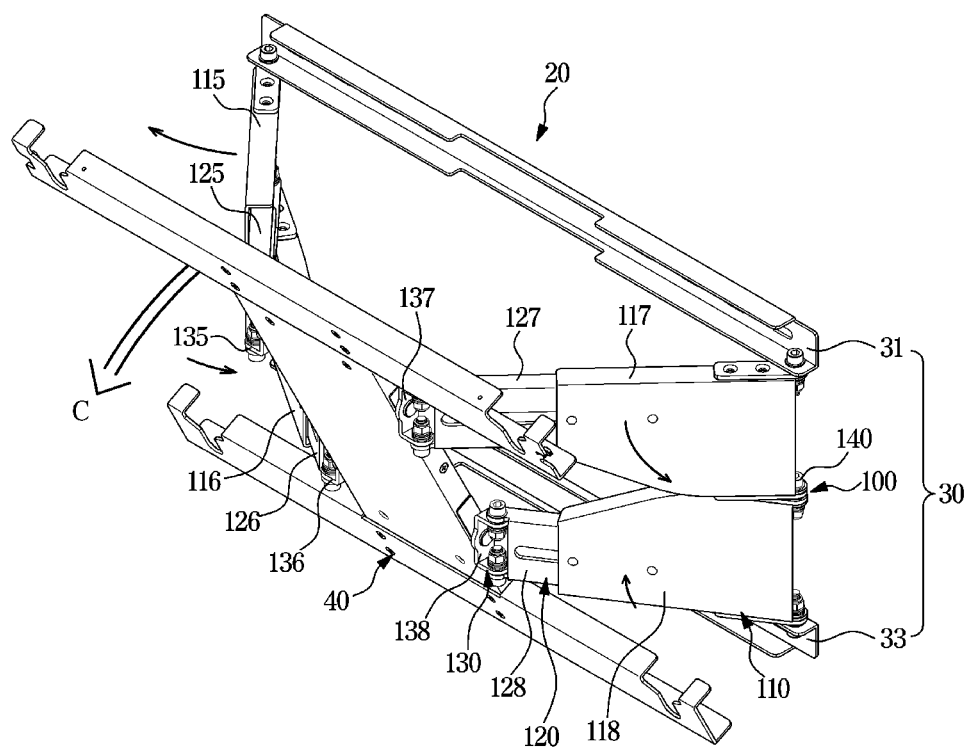
FIG. 14 is a perspective view illustrating a position of a mounting bracket of the wall mount of FIG. 1 rotated forward according to the principles of the invention.
Figure 16:
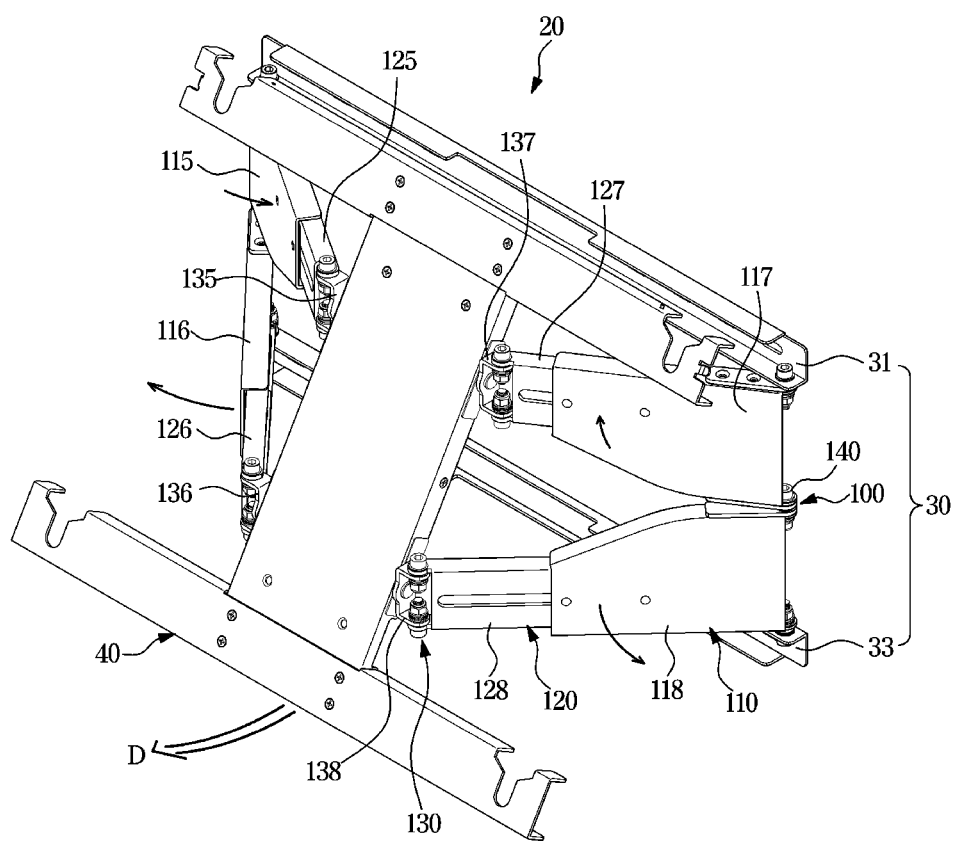
FIG. 16 is a perspective view illustrating a position of a mounting bracket of the wall mount of FIG. 1 rotated backward according to the principles of the invention.

The rotatable directions of the mounting bracket 40 are shown illustratively in the drawings. For example, when the mounting bracket 40 rotates in direction A as shown in FIG. 10, the rotation may be defined as a rotation in a leftward (clockwise relative to a vertical axis) direction. When the mounting bracket 40 rotates in direction B as shown in FIG. 12, the rotation may be defined as a rotation in a rightward (counter-clockwise relative to a vertical axis) direction. When the mounting bracket 40 rotates in direction C as shown in FIG. 14, the rotation may be defined as a rotation in a forward (counter-clockwise relative to a horizontal axis) direction. When the mounting bracket 40 rotates in direction D as shown in FIG. 16, the rotation may be defined as a rotation in a backward (clockwise relative to a horizontal axis) direction.

Figure 3:
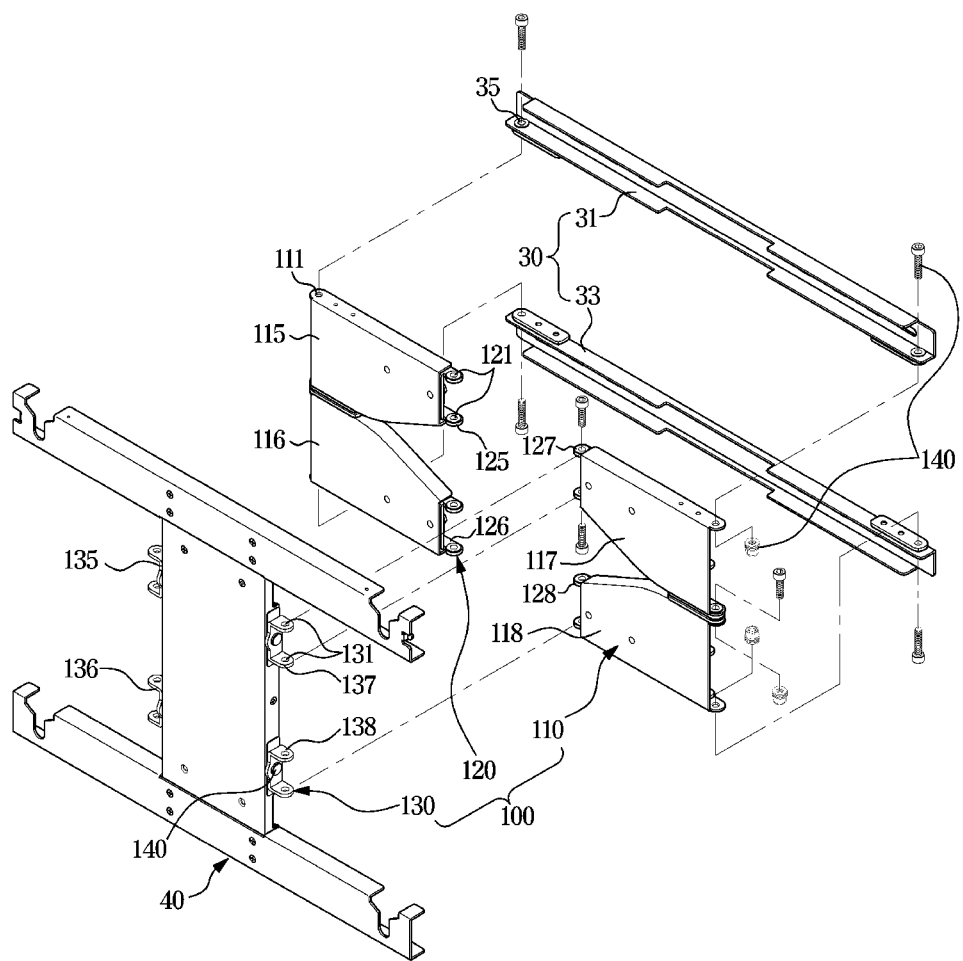
FIG. 3 is an exploded perspective view of the wall mount of FIG. 1.
Figure 4:
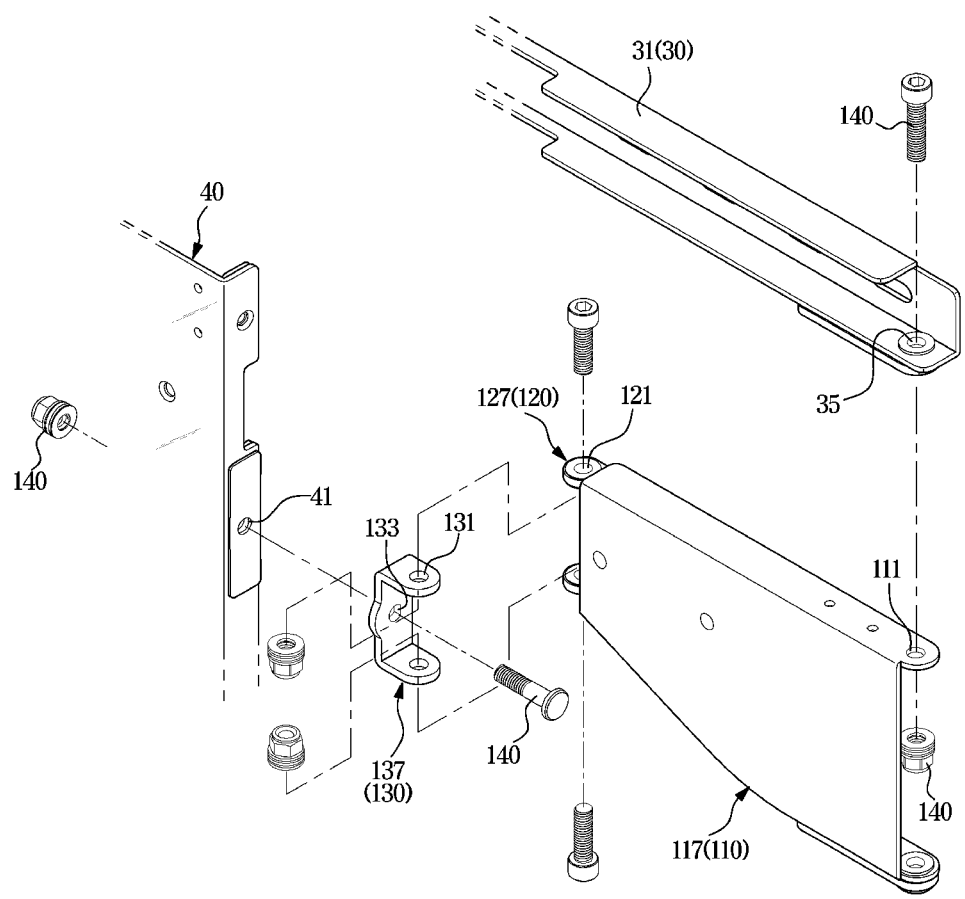
FIG. 4 is a perspective view illustrating a process of connecting various parts of the wall mount of FIG. 1, including a rotating bracket to a fixing bracket to be rotatable in leftward and rightward directions, and connecting a connecting bracket to a mounting bracket to be rotatable in forward and backward directions according to the principles of the invention.
Figure 5:
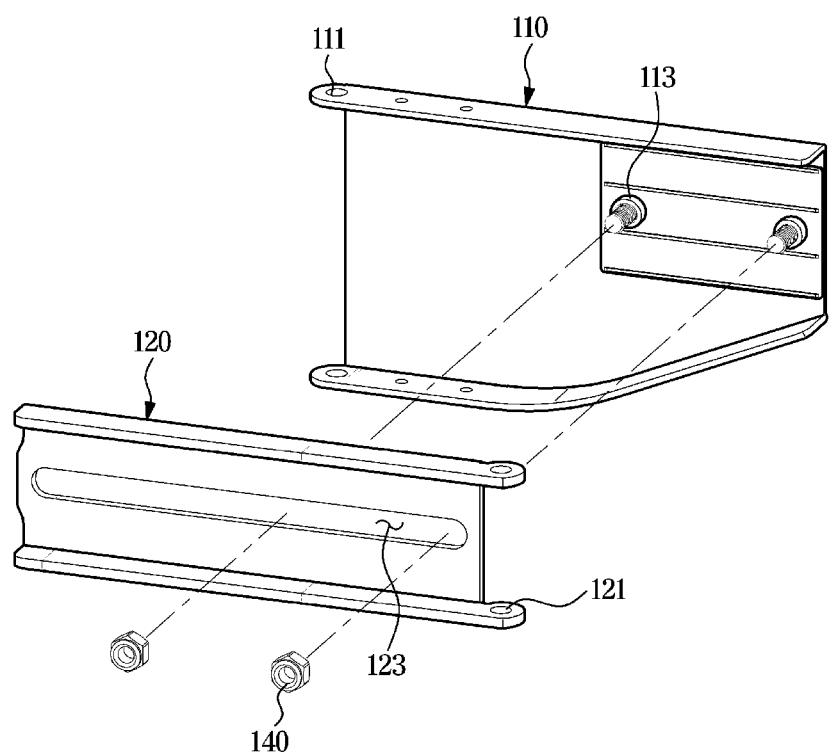
FIG. 5 is a perspective view illustrating a process of assembling a moving bracket of the wall mount of FIG. 1, with a rotating bracket according to the principles of the invention.
Figure 6:
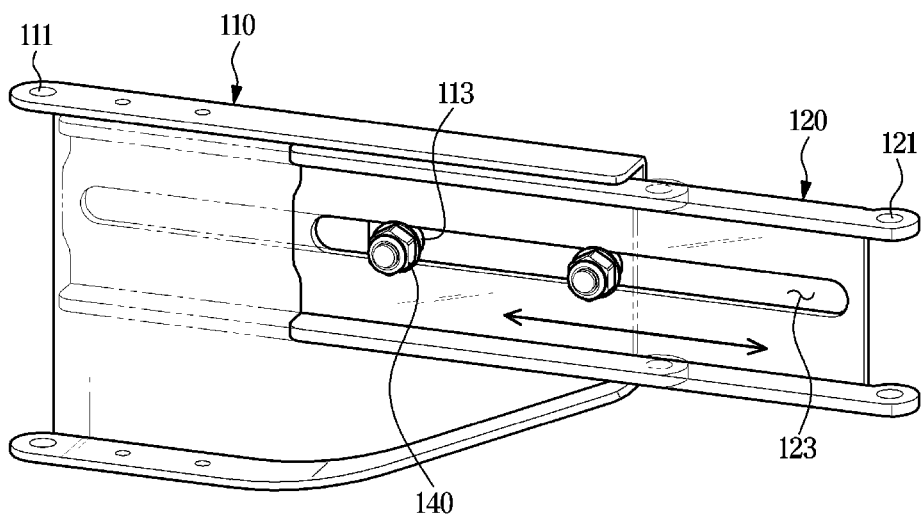
FIG. 6 is a perspective view illustrating a process of a moving bracket of the wall mount of FIG. 1 supported for slidable movement in the leftward and rightward directions with respect to a rotating bracket according to the principles of the invention.

FIG. 3 is an exploded perspective view of the wall mount of FIG. 1. FIG. 4 is a perspective view illustrating a process of connecting various parts of the wall mount of FIG. 1, including a rotating bracket to a fixing bracket to be rotatable in leftward and rightward directions, and connecting a connecting bracket to a mounting bracket to be rotatable in forward and backward directions according to the principles of the invention. FIG. 5 is a perspective view illustrating a process of assembling a moving bracket of the wall mount of FIG. 1, with a rotating bracket according to the principles of the invention. FIG. 6 is a perspective view illustrating a process of a moving bracket of the wall mount of FIG. 1 supported for slidable movement in the leftward and rightward directions with respect to a rotating bracket according to the principles of the invention.

Referring to FIGS. 3 to 6, the wall mount 20 may include the fixing bracket 30, which may be attached to the wall surface 1. The fixing bracket 30 may include a first fixing bracket 31 and a second fixing bracket 33. The first fixing bracket 31 may be provided above the second fixing bracket 33. The second fixing bracket 33 may be provided below the first fixing bracket 31.

The fixing bracket 30 may include a plurality of first rotation holes 35 to which a plurality of rotatable supports that may be in the form of rotating brackets 110 may be connected by suitable fasteners, such that the rotating brackets 110 are supported for rotation in the leftward and rightward directions. The first rotation holes 35 may be provided at left and right side ends of the first fixing bracket 31, and at left and right side ends of the second fixing bracket 33.

The wall mount 20 may include a mounting bracket 40 on which the display 10 is to be attached. The mounting bracket 40 may be connected to and supported by the fixing bracket 30 for rotation in the forward and backward directions and leftward and rightward directions by the connecting device 100. The mounting bracket 40 may include a plurality of third rotation holes 41, to which a plurality of connecting supports that may be in the form of connecting brackets 130 are connected by suitable fasteners to support the mounting bracket 40 for rotations in the forward and backward directions.

The mounting bracket 40 may be provided in various shapes according to the shape of the display 10 to be mounted thereon. More particularly, the mounting bracket 40 may have a shape that generally conforms to the shape of the display 10. For example, when the display 10 has a substantially flat shape, the mounting bracket 40 may be provided in a substantially flat shape that generally corresponds to the shape of the display 10. As another example, when the display 10 has a curved shape, the mounting bracket 40 may be provided in a curved shape that generally corresponds to the shape of the display 10.

In addition, the mounting bracket 40 may have various shapes and sizes and be replaceable to match the size, weight, and shape of the display 10 to be mounted thereon. For example, when the size and weight of the display 10 are large, the mounting bracket 40 may have a large size to sufficiently support the display 10. As another example, when the size and weight of the display 10 are small, the mounting bracket 40 may also have a small size.

The connecting device 100 may connect the fixing bracket 30 and the mounting bracket 40 to each other. The connecting device 100 may include the rotating brackets 110 that are connected to and supported by the fixing bracket 30 for rotation in the leftward and rightward directions. The rotating brackets 110 may include first connection holes 111 connected to the first rotation holes 35 of the fixing bracket 30 to enable rotation in the leftward and rightward directions. The first connection holes 111 may be provided in each of the rotating brackets 110. The first rotation hole 35 of the fixing bracket 30 and the first connection hole 111 of the rotating bracket 110 may be connected to each other by a fastener that may be in the form of a fastening member 140. For example, the fastening member 140 may include a bolt and a nut. However, the inventive concepts are not limited to a particular form of the fastening member 140, as long as the fastening member 140 can provide secure connection between two adjacent elements while allowing for rotational movements therebetween. For example, in some illustrative embodiments, the fastening member 140 may include screws, anchors, rivets, and the like, as well known in the art.

Each of the rotating brackets 110 may include a guide protrusion 113 for supporting a movable support that may be in the form of a moving bracket 120 for slide movement in the leftward and rightward directions. The guide protrusion 113 may be formed to protrude in a direction toward the moving bracket 120 that is assembled to the rotating bracket 110. The guide protrusion 113 may be inserted into a slot formed in a guide rail 123 of the moving bracket 120. The guide protrusion 113 inserted into the slot of the guide rail 123 may be assembled by a fastening member 140. For example, the fastening member 140 may include a nut. The guide rail 123 may guide linear movement of the moving bracket 120, as the moving bracket 120 slides in the leftward and rightward directions along the guide rail 123.

The guide protrusion 113 may be provided in plural. For example, the guide protrusion 113 for each rotating bracket 110 may be provided in a pair as shown in the drawings for efficient distribution of the weight of the display 10 mounted on the mounting bracket 40. However, the inventive concepts are not limited to a particular number of the guide protrusions 113 formed in the rotating bracket 110, and the number of the guide protrusions 113 for each rotating bracket may be varied in other illustrative embodiments.

The connecting device 100 may include the moving brackets 120, each of which is assembled to a corresponding one of the rotating brackets 110 to be supported for slidable movement in the leftward and rightward directions. The moving bracket 120 may be provided in plural to correspond to the rotating brackets 110. The moving bracket 120 may include second connection holes 121 connected to second rotation holes 131 of the connecting bracket 130 for rotation in the leftward and rightward directions. The second connection hole 121 may be provided in each of the moving brackets 120. The second connection hole 121 of the moving bracket 120 and the second rotation hole 131 of the connecting bracket 130 may be connected to each other by a fastening member 140. For example, the fastening member 140 may include a bolt and a nut. As shown in FIGS. 1 to 3, the rotating bracket 110 may substantially enclose the moving bracket 120 except for the corresponding connection hole when the mounting bracket 40 is in a substantially flat position before being moved forward.

Each of the moving brackets 120 may include the guide rail 123, into which the guide protrusions 113 of the rotating bracket 110 are inserted to be guided by the guide protrusions 113. As noted above, the guide rail 123 may have a slot extending along the lateral direction of the moving bracket 120. When the guide protrusions 113 are inserted into the guide rail 123 and assembled by the fastening member 140, the moving bracket 120 may be moved, with the guide rail 123 being guided by the guide protrusions 113, to be supported for linear movement in the leftward and rightward directions with respect to the rotating bracket 110.

Although the moving brackets 120 are exemplarily illustrated and described as being guided by the guide protrusions 113 of the rotating brackets 110 through the guide rails 123 formed on the moving brackets 120, the inventive concepts are not limited thereto. According to another illustrative embodiment, at least one of the rotating brackets 110 may include upper and lower guide rails, and the corresponding moving bracket 120 may include at least one or more rollers that are at least partially enclosed by the upper and lower guide rails. In this case, the roller may move along the guide rails in the rotating bracket 110 such that the moving bracket 120 may slide in the leftward and rightward directions with respect to the rotating bracket 110 to facilitate the sliding operation.

As described above, the wall mount 20 constructed according to principles and illustrative embodiments of the invention may be formed to have a thin (slim) form factor in a direction normal to the wall surface 1, especially in the compact, unexpanded or collapsed position, since rotation of the mounting bracket 40 in the forward and backward directions and leftward and rightward directions is implemented through a simple structure, in which the plurality of moving brackets 120 are slidably moved in the leftward and rightward directions with respect to the plurality of rotating brackets 110. In addition, since illustrative embodiments of the wall mount 20 obviate the need for a conventional spring hinge, the material costs of manufacturing the wall mount 20, as well as the thickness and complexity of the wall mount may be reduced relative to conventional designs.

The connecting device 100 may include the connecting brackets 130, each of which is supported by the mounting bracket 40 for rotation in the forward and backward directions, as well as being connected to and supported by a corresponding moving bracket 120 for rotation in the leftward and rightward directions. Each of the connecting brackets 130 may include the second rotation hole 131 connected to the second connection hole 121 of the moving bracket 120 to enable rotation in the leftward and rightward directions. The second connection hole 121 of the moving bracket 120 and the second rotation hole 131 of the connecting bracket 130 may be connected to each other by a fastening member 140. For example, the fastening member 140 may include a bolt and a nut. In this case, the connecting bracket 130 may be connected to the moving bracket 120 in a non-rotational manner.

Each of the connecting brackets 130 may include a third connection hole 133, by which the connecting bracket 130 is connected to and supported by the mounting bracket 40 for rotation in the forward and backward directions. The third connection hole 133 of the connecting bracket 130 may be connected to the third rotation hole 41 of the mounting bracket 40 by a fastening member 140. For example, the fastening member 140 may include a bolt and a nut. In this case, the connecting bracket 130 may be connected to the mounting bracket 40 in a rotatable manner.

The plurality of rotating brackets 110, the plurality of moving brackets 120, and the plurality of connecting brackets 130 may each be provided in units of four.

In particular, the rotating brackets 110 may include a first rotating bracket 115, a second rotating bracket 116, a third rotating bracket 117, and a fourth rotating bracket 118. The first rotating bracket 115 may be connected to the left end of the first fixing bracket 31, which is the upper left end of the fixing bracket 30. The second rotating bracket 116 may be connected to the left end of the second fixing bracket 33, which is the lower left end of the fixing bracket 30. The third rotating bracket 117 may be connected to the right end of the first fixing bracket 31, which is the upper right end of the fixing bracket 30. The fourth rotating bracket 118 may be connected to the right end of the second fixing bracket 33, which is the lower right end of the fixing bracket 30.

The plurality of moving brackets 120 may include a first moving bracket 125 assembled to the first rotating bracket 115, a second moving bracket 126 assembled to the second rotating bracket 116, a third moving bracket 127 assembled to the third rotating bracket 117, and a fourth moving bracket 128 assembled to the fourth rotating bracket 118.

The plurality of connecting brackets 130 may include a first connecting bracket 135 connected to the first moving bracket 125, a second connecting bracket 136 connected to the second moving bracket 126, a third connecting bracket 137 connected to the third moving bracket 127, and a fourth connecting bracket 138 connected to the fourth moving bracket 128.

Next, rotations of the mounting bracket 40 in the forward and backward directions and leftward and rightward directions will be described in further detail with reference to FIGS. 7 to 17.

Figure 7:
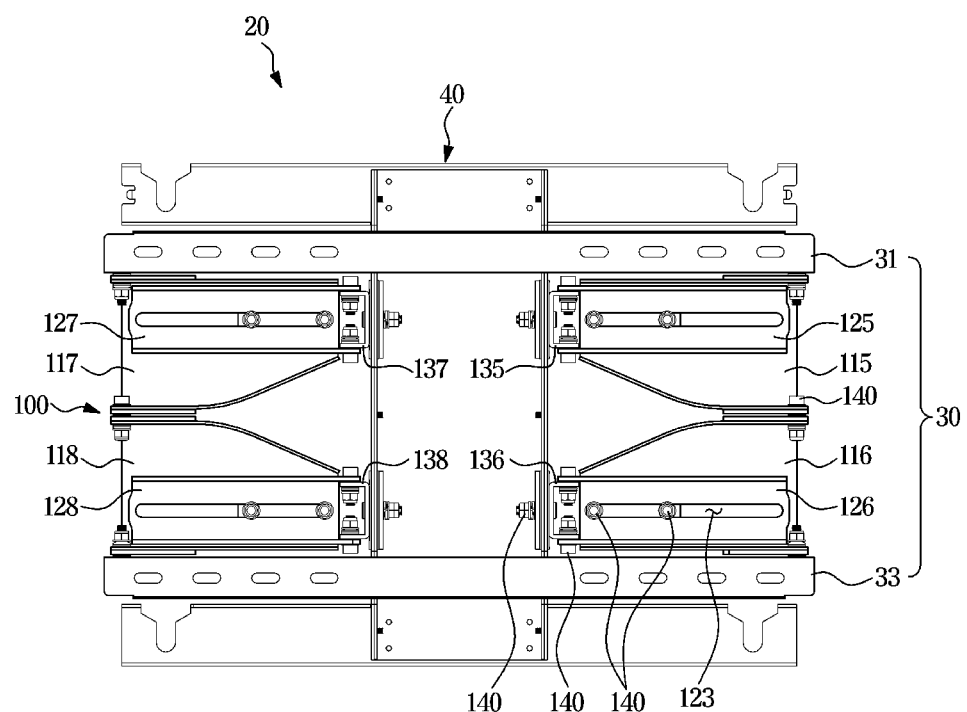
FIG. 7 is a view illustrating a rear surface of the wall mount of FIG. 1.
Figure 8:
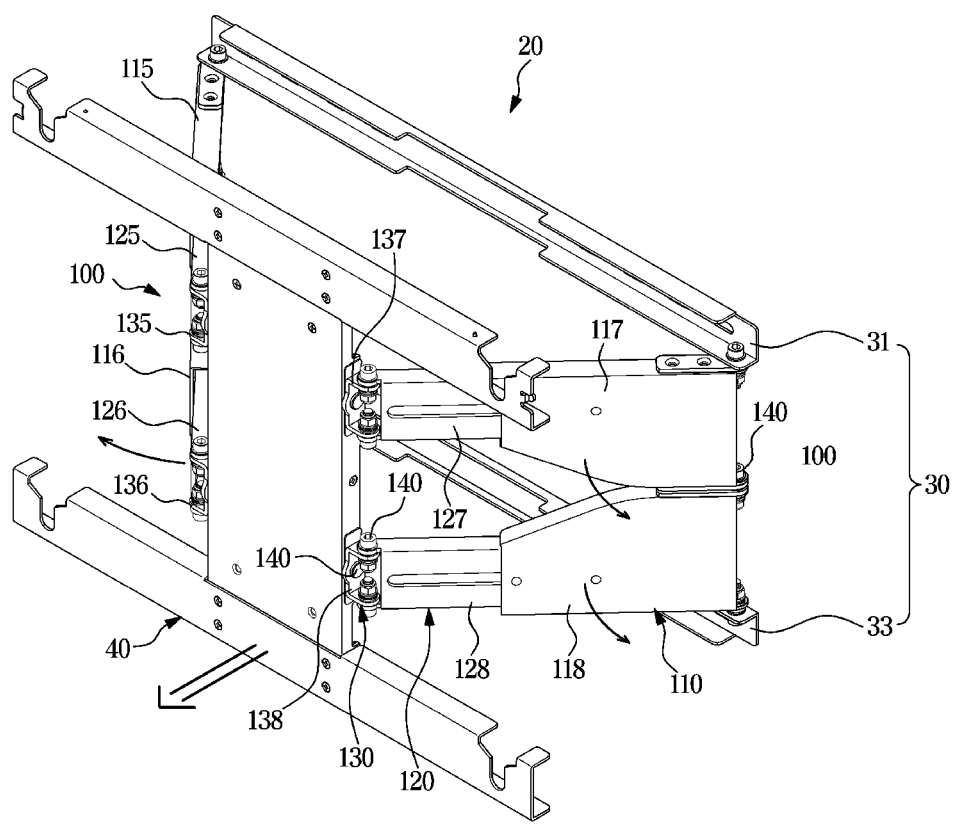
FIG. 8 is a perspective view illustrating a position of a mounting bracket of the wall mount of FIG. 1 moved forward according to an illustrative embodiment.
Figure 9:
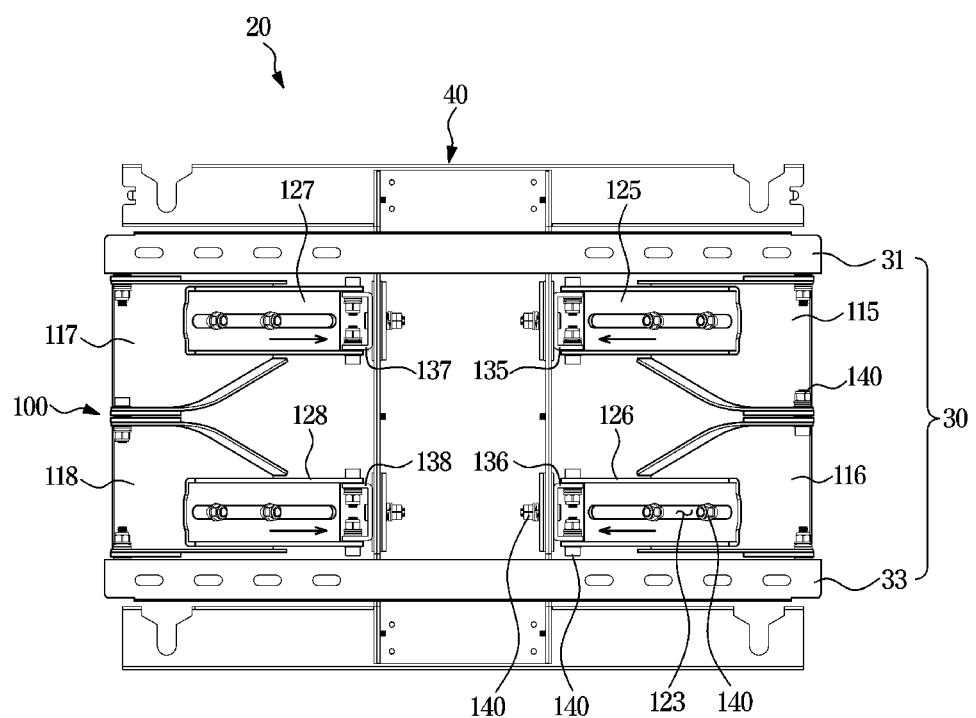
FIG. 9 is a rear plan view of the wall mount shown in FIG. 8.
Figure 11:
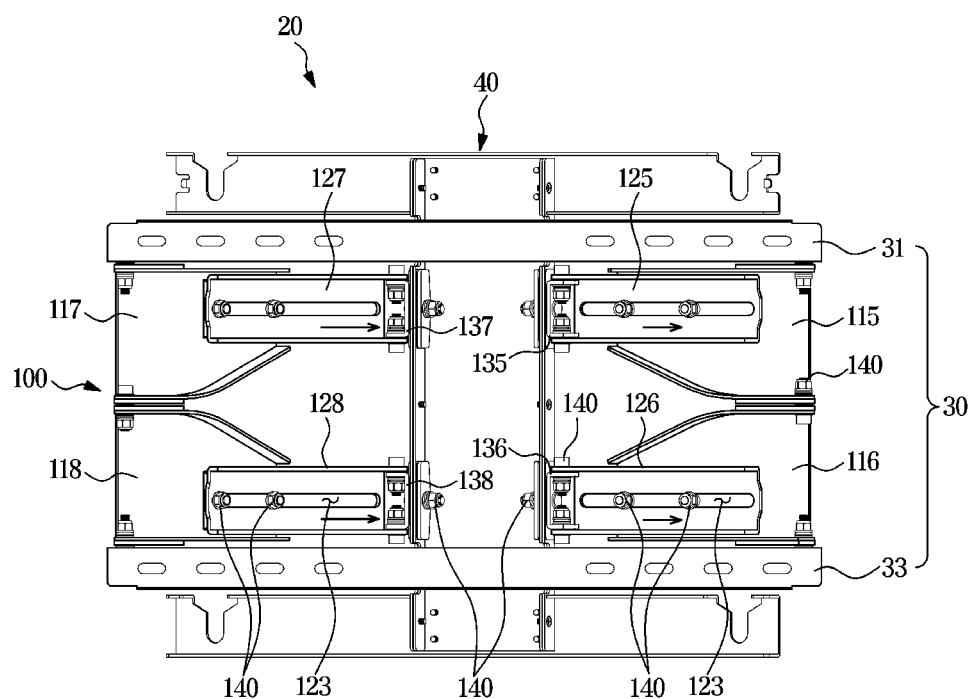
FIG. 11 is a rear plan view of the wall mount shown in FIG. 10.
Figure 13:
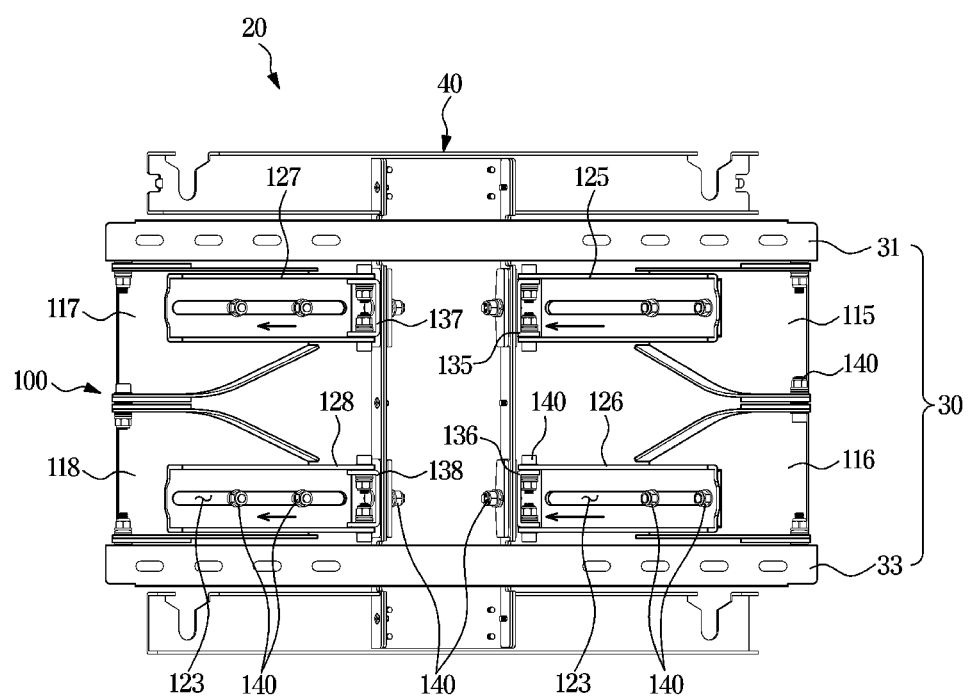
FIG. 13 is a rear plan view of the wall mount shown in FIG. 12.
Figure 15:
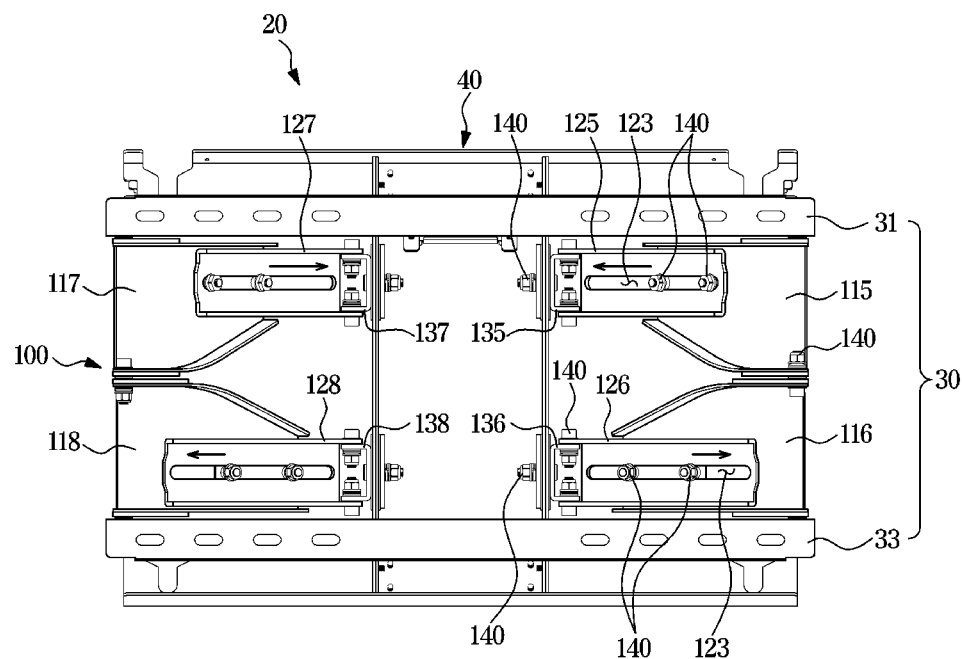
FIG. 15 is a rear plan view of the wall mount shown in FIG. 14.
Figure 17:
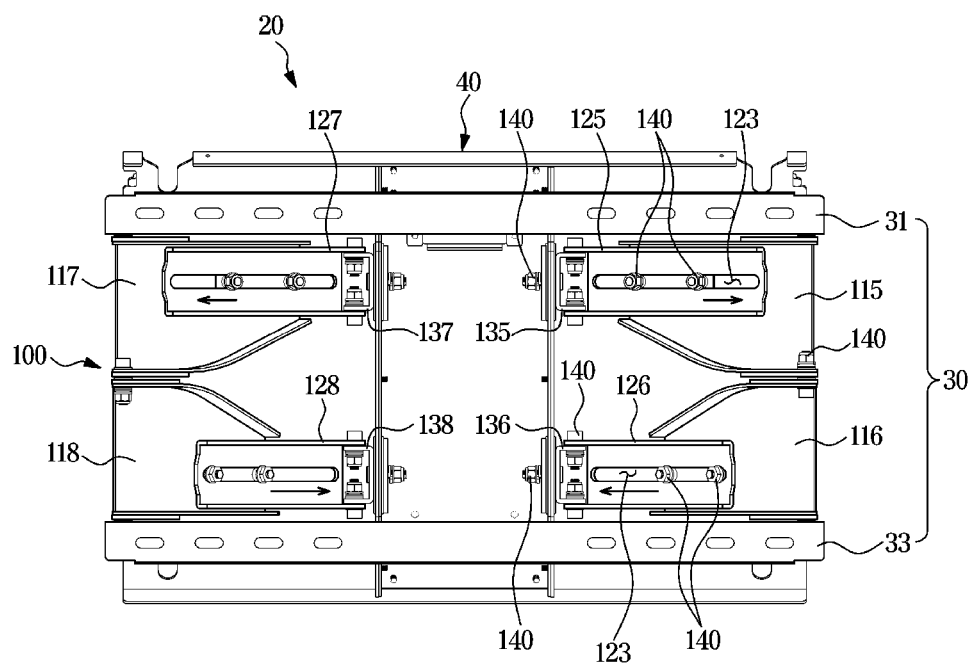
FIG. 17 is a rear plan view of the wall mount shown in FIG. 16.

FIG. 7 is a view illustrating a rear surface of the wall mount of FIG. 1. FIG. 8 is a perspective view illustrating a position of a mounting bracket of the wall mount of FIG. 1 moved forward according to an illustrative embodiment. FIG. 9 is a rear plan view of the wall mount shown in FIG. 8. FIG. 10 is a perspective view illustrating a position of a mounting bracket of the wall mount of FIG. 1 rotated to the left according to the principles of the invention. FIG. 11 is a rear plan view of the wall mount shown in FIG. 10. FIG. 12 is a perspective view illustrating a position of a mounting bracket of the wall mount of FIG. 1 rotated to the right according to the principles of the invention. FIG. 13 is a rear plan view of the wall mount shown in FIG. 12. FIG. 14 is a perspective view illustrating a position of a mounting bracket of the wall mount of FIG. 1 rotated forward according to the principles of the invention. FIG. 15 is a rear plan view of the wall mount shown in FIG. 14. FIG. 16 is a perspective view illustrating a position of a mounting bracket of the wall mount of FIG. 1 rotated backward according to the principles of the invention. FIG. 17 is a rear plan view of the wall mount shown in FIG. 16.

Referring to FIG. 7, the mounting bracket 40 is in a position before being moved forward. Referring to FIGS. 8 to 9, the mounting bracket 40 may be moved forward, so that the first rotating bracket 115 and the second rotating bracket 116 may be rotated in the leftward direction, and the third rotating bracket 117 and the fourth rotating bracket 118 may be rotated in the rightward direction. In this case, the first moving bracket 125 and the second moving bracket 126 may be slidably moved to the right side, as shown in FIG. 8. In addition, the third moving bracket 127 and the fourth moving bracket 128 may be slidably moved to the left side, as shown in FIG. 8. The moving directions of the moving brackets 120 are described based on a direction facing the front of the wall mount 20, and thus, in FIG. 9 which shows the rear surface of the wall mount 20, the moving directions of the moving brackets 120 may be marked in the opposite directions.

Referring to FIGS. 10 and 11, the mounting bracket 40 may be moved forward and rotated in direction A, which is the leftward direction. In this case, the first rotating bracket 115 and the second rotating bracket 116 may be rotated in the rightward direction, and the third rotating bracket 117 and the fourth rotating bracket 118 may be rotated in the rightward direction. In addition, the first moving bracket 125 and the second moving bracket 126 may be slidably moved to the left side, and the third moving bracket 127 and the fourth moving bracket 128 may be slidably moved to the left side.

Referring to FIGS. 12 to 13, the mounting bracket 40 may be moved forward and rotated in direction B, which is the rightward direction. In this case, the first rotating bracket 115 and the second rotating bracket 116 may be rotated in the leftward direction, and the third rotating bracket 117 and the fourth rotating bracket 118 may be rotated in the leftward direction. In addition, the first moving bracket 125 and the second moving bracket 126 may be slidably moved to the right side, and the third moving bracket 127 and the fourth moving bracket 128 may be slidably moved to the right side.

Referring to FIGS. 14 and 15, the mounting bracket 40 may be moved forward and rotated in direction C, which is the forward direction. In this case, the first rotating bracket 115 and the fourth rotating bracket 118 may be rotated in the leftward direction, and the second rotating bracket 116 and the third rotating bracket 117 may be rotated in the rightward direction. In addition, the first moving bracket 125 and the fourth moving bracket 128 may be slidably moved to the right side, while the second moving bracket 126 and the third moving bracket 127 may be slidably moved to the left side.

Referring to FIGS. 16 to 17, the mounting bracket 40 may be moved forward and rotated in direction D, which is the backward direction. In this manner, the first rotating bracket 115 and the fourth rotating bracket 118 may be rotated in the rightward direction, and the second rotating bracket 116 and the third rotating bracket 117 may be rotated in the leftward direction. In addition, the first moving bracket 125 and the fourth moving bracket 128 may be slidably moved to the left side, while the second moving bracket 126 and the third moving bracket 127 may be slidably moved to the right side.

Although certain illustrative embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A display apparatus comprising:
    a display; and
    a support member including:
        a fixing member to be fixed to a wall surface;
        a mounting member on which the display is to be mounted and connected to the fixing member; and
        a connector attaching the mounting member to the fixing member and supported for rotation in forward, backward, leftward, and rightward directions,
    wherein the connector includes:
        a plurality of rotatable supports connected to the fixing member and supported for rotation in the leftward and rightward directions;
        a plurality of movable supports connected to a corresponding one of the rotatable supports and supported for slidable movement in the leftward and rightward directions; and
        a plurality of connecting supports each connected to the mounting member and supported for rotation in the forward and backward directions, and connected to a corresponding one of the movable supports to rotate in the leftward and rightward directions.

2. The display apparatus of claim 1, wherein at least one the following applies:
    the support member comprises a wall mount;
    the fixing member comprises a fixing bracket;
    the mounting member comprises a mounting bracket;
    the connector comprises a connecting device;
    the rotatable supports comprise rotating brackets;
    the movable supports comprise moving brackets; and
    the connecting supports comprise connecting brackets.

3. The display apparatus of claim 2, wherein the rotating brackets comprise a plurality of protrusions extending in a direction toward the moving brackets.

4. The display apparatus of claim 3, wherein each of the moving brackets comprises a slot into which the protrusions are inserted and supported for linear movement.

5. The display apparatus of claim 4, wherein each of the moving brackets is connected to a corresponding one of the rotating brackets by fastening members connected to the protrusions inserted into the slot.

6. The display apparatus of claim 5, wherein the slot extends longitudinally in a rail along the direction of linear movement of the moving brackets.

7. The display apparatus of claim 5, wherein the moving brackets, in response to the mounting bracket being rotated in the forward and backward directions and leftward and rightward directions, slide in the leftward and rightward directions with respect to the rotating brackets.

8. The display apparatus of claim 1, wherein:
each of the rotatable supports includes a first connection hole for connection to the fixing member; and
the fixing member includes a plurality of first rotation holes provided at positions corresponding to the first connection holes.

9. The display apparatus of claim 1, wherein:
each of the movable supports comprises a second connection hole for connection to a corresponding one of the connector supports; and
each of the connector supports comprises a second rotation hole at a position corresponding to the second connection hole, and a third connection hole through which the connector support is connected to the mounting member.

10. The display apparatus of claim 1, wherein the rotatable supports comprise:
a first rotating bracket connected to an upper left end of the fixing member;
a second rotating bracket connected to a lower left end of the fixing member;
a third rotating bracket connected to a upper right end of the fixing member; and
a fourth rotating bracket connected to a lower right end of the fixing member.

11. The display apparatus of claim 10, wherein:
the movable supports comprise a first moving bracket, a second moving bracket, a third moving bracket, and a fourth moving bracket to correspond to the rotatable supports; and
the connecting supports comprise a first connecting bracket, a second connecting bracket, a third connecting bracket, and a fourth connecting bracket to correspond to the movable supports.

12. The display apparatus of claim 11, wherein, when the mounting member is moved forward, the first and second rotating brackets are rotated in the leftward direction, the third and fourth rotating brackets are rotated in the rightward direction, the first and second moving brackets are moved to the right, and the third and fourth moving brackets are moved to the left.

13. The display apparatus of claim 12, wherein, when the mounting member is rotated in the leftward direction, the first and second rotating brackets are rotated in the rightward direction, the third and fourth rotating brackets are rotated in the rightward direction, the first and second moving brackets are moved to the left, and the third and fourth moving brackets are moved to the left.

14. The display apparatus of claim 12, wherein when the mounting member is rotated in the rightward direction, the first and second rotating brackets are rotated in the leftward direction, the third and fourth rotating brackets are rotated in the leftward direction, the first and second moving brackets are moved to the right, and the third and fourth moving brackets are moved to the right.

15. The display apparatus of claim 12, wherein when the mounting member is rotated in the forward direction, the first and fourth rotating brackets are rotated in the leftward direction, the second and third rotating brackets are rotated in the rightward direction, the first and fourth moving brackets are moved to the right, and the second and third moving brackets are moved to the left.

16. The display apparatus of claim 12, wherein when the mounting member is rotated in the backward direction, the first and fourth rotating brackets are rotated in the rightward direction, the second and third rotating brackets are rotated in the leftward direction, the first and fourth moving brackets are moved to the left, and the second and third moving brackets are moved to the right.

17. A display apparatus comprising:
a display; and
a support member including:
a fixing member to be fixed to a wall surface;
a mounting member on which the display is to be mounted and connected to the fixing member; and
a connector attaching the mounting member to the fixing member and supported for rotation in forward, backward, leftward, and rightward directions, the connector including:
a plurality of first supports rotatably connected to the fixing member;
a plurality of second supports slidably connected to the first supports; and
a plurality of third supports having a first end non-rotatably connected to the second supports and a second end rotatably connected to the mounting member.

18. The display apparatus of claim 17, wherein each of the second supports comprises a second bracket including a rail supporting the second bracket for linear movement in the direction of linear movement of the corresponding first bracket.

19. The display apparatus of claim 18, wherein:
the first supports comprise first brackets;
adjacent first brackets are supported for rotation in opposite directions; and
adjacent second brackets are supported for linear movement in opposite directions.

20. The display apparatus of claim 17, wherein each of the first supports substantially enclose a corresponding one of the second supports.

* * * * *

UNITED STATES PATENT AND TRADEMARK OFFICE
CERTIFICATE OF CORRECTION

| | |
|---|---|
| PATENT NO. | : 11,925,278 B2 |
| APPLICATION NO. | : 17/575305 |
| DATED | : March 12, 2024 |
| INVENTOR(S) | : Daesik Yoon et al. |

It is certified that error appears in the above-identified patent and that said Letters Patent is hereby corrected as shown below:

In the Specification

Column 1, Line 11, delete "221," and insert --2021,--.

In the Claims

Column 12, Lines 56-57, In Claim 2, delete "one the" and insert --one of the--.

Signed and Sealed this
Seventh Day of May, 2024

Katherine Kelly Vidal
*Director of the United States Patent and Trademark Office*